United States Patent [19]

Farkas et al.

[11] 4,145,204

[45] Mar. 20, 1979

[54] TIMING PULSE GENERATOR FOR A GLASSWARE FORMING MACHINE

[75] Inventors: Daniel S. Farkas; Philip D. Perry, both of Toledo, Ohio

[73] Assignee: Owens-Illinois, Inc., Toledo, Ohio

[21] Appl. No.: 856,387

[22] Filed: Dec. 1, 1977

[51] Int. Cl.² .............................................. C03B 9/40
[52] U.S. Cl. ...................................... 65/164; 65/158; 65/163; 65/DIG. 13; 364/473; 364/476
[58] Field of Search ................... 65/29, 158, 159, 160, 65/163, 164, DIG. 13; 364/473, 476

[56] References Cited

U.S. PATENT DOCUMENTS

| | | | |
|---|---|---|---|
| 3,762,907 | 10/1973 | Quinn et al. | 65/164 |
| 3,957,477 | 5/1976 | Jones et al. | 65/158 |
| 4,007,028 | 2/1977 | Bublitz et al. | 65/163 |

*Primary Examiner*—Arthur D. Kellogg
*Attorney, Agent, or Firm*—D. H. Wilson; M. E. Click

[57] ABSTRACT

A glassware forming machine including means for distributing gobs of molten glass to individual sections of the machine at a predetermined rate, drive means responsive to electrical power of a selected frequency generated by a power source for driving the gob distributing means at the predetermined rate and an automatic control means responsive to timing signals for controlling each of the individual sections in a predetermined timed sequence of steps for forming the glassware wherein the power source generates the timing signals at a frequency proportional to the selected frequency of the power source. Each piece of glassware is formed during a machine cycle which is related in duration to the gob distribution rate and typically is defined in terms of 360°. The power source includes a timing pulse generator which synthesizes the timing signals from the power source electric power frequency at the frequency required for defining 360° per machine cycle.

11 Claims, 6 Drawing Figures

TABLE OF TIMING VALUES

| F(LVO) Hz (FIG. 4 ONLY) | 1200 | 1440 | 2880 | 5760 | 6000 | NUMBER OF SECTIONS | F(IN)Hz/CUT |
|---|---|---|---|---|---|---|---|
| F(IN) Hz | 20 | 24 | 48 | 96 | 100 | | |
| CUTS/MINUTE | 25.0 | 30.0 | 60.0 | 120.0 | 125.0 | 6 | 48 |
| | 33.3 | 40.0 | 80.0 | 160.0 | 166.6 | 8 | 36 |
| | 41.6 | 50.0 | 100.0 | 200.0 | 208.3 | 10 | 28.8 |
| TURNS/MINUTE | 4.16 | 5.00 | 10.00 | 20.00 | 20.83 | | |
| F(OUT) Hz | 25 | 30 | 60 | 120 | 125 | | |

TIMING PULSE GENERATOR FOR A GLASSWARE FORMING MACHINE

CROSS-REFERENCE FOR RELATED APPLICATION

This invention is related in subject matter to the invention disclosed in the patent application of Daniel S. Farkas and Erwin M. Ferenczy, entitled "Timing Pulse Generator For A Glassware Forming Machine", Ser. No. 860,934 filed Dec. 15, 1977.

BACKGROUND OF THE INVENTION

1. Field of the Invention

The present invention relates in general to control systems for glassware forming machines and in particular to a timing pulse generator for generating clock pulses for controlling individual sections of the machine in a predetermined timed sequence of steps.

2. Description of the Prior Art

In a glassware forming machine known as an IS or individual section machine, each individual section includes a plurality of means for performing a predetermined sequence of steps in a timed relationship to form the glassware. The forming means are generally powered by pneumatic motors controlled by a valve block which, in turn, is controlled by a rotating timing drum. Glass is melted and formed into gobs which are guided to the individual sections by a gob distributor. Each section of the machine produces glassware from the gobs which glassware is placed on a dead plate for push out onto a flight conveyor for removal to a lehr for annealing and cooling and any other treatment.

The individual sections are operated in a predetermined sequence at a relative phase difference to receive gobs from the gob distributor in ordered sequence. As one of the sections is receiving a gob from the gob distributor, another one of the sections is delivering a finished article of glassware to the conveyor, and the other sections are performing various ones of the forming steps. Furthermore, two molds can be provided in each section whereby a gob is received in a first mold, called the blank or parison mold, for the initial process of forming a parison, followed by transfer of the parison to a second mold, called the blow mold, for final blowing of the article. Thus, each section of the machine is operating simultaneously upon two articles.

The timing drum includes a plurality of adjustable cam members positioned around the cylindrical periphery thereof for mechanically operating the pneumatic valves in the valve block in a predetermined sequence. The timing drums for all the sections are driven in synchronism with the gob distributor and the conveyor resulting in a continuing flow of glass gobs into the machine and a continuing flow of glass down the conveyor.

However, it is difficult to adjust the timing of any of the means for performing the forming steps in an individual section. The cam members are generally mounted in annular grooves in the drum surface and are held in position by a clamping device such as a nut. As the drum is rotating, the nut must be loosened, the cam member moved in the groove and the nut tightened again. Such operation is undesirable since it is difficult to obtain accuracy and is subject to mechanical wear resulting in changed timing.

One solution to the timing problem is disclosed in U.S. Pat. No. 3,762,907, issued Oct. 2, 1973 to R. M. Quinn et al., wherein the valves of the valve block are actuated by solenoids controlled by an electronic control system. The control system receives clock signals and reset signals from a pair of pulse generators driven by a common drive shaft for the machine.

Another solution to the timing problem is disclosed in U.S. Pat. No. 4,007,028, issued Feb. 8, 1977 to A. T. Bublitz et al., wherein individual drive motors are used to drive the gob feeder, gob distributor and take-off conveyor. Each drive motor is supplied with power from its individual inverter and a frequency control means is utilized to adjust the speed of the motors. Position transducers generate signals to a computer to indicate the positions of the gob feeder and gob distributer and the computer also receives signals indicating actuation of the glassware forming elements. The computer stores information as to the timing of the actuation of the forming elements and is responsive to a clock for generating control signals to the salenoids for actuating the valves of the valve block.

SUMMARY OF THE INVENTION

The present invention concerns a timing pulse generator for a glassware forming machine having a plurality of individual sections each capable of forming glassware from gobs of molten glass. A gob distributor supplies the gobs to the individual sections at a predetermined rate proportional to the speed of a gob distributor drive motor. The speed of the drive motor is determined by the frequency of the alternating current power generated by a power source such as an inverter drive. Thus, the cycle time of each individual section and, therefore, the cycle time of the machine is determined by the gob distribution rate.

Typically, the forming steps performed by the elements of the individual sections are timed by dividing the machine cycle into 360° and referencing the steps to the start of the cycle with the sequence of steps for each individual section offset by a different number of degrees. The timing pulse generator of the present invention is responsive to the inverter power frequency for generating a timing signal at a frequency which provides 360 pulses per machine cycle. This timing signal frequency is synthesized from the inverter power frequency by dividing the inverter power frequency by a first factor M and applying the divided by M frequency signal to one input of a phase locked loop. The phase locked loop output signal frequency is divided by a factor of N and the divided by N frequency signal is applied to the other input of the phase locked loop. The phase locked loop is responsive to any error between the divided by M frequency and the divided by N frequency to change the output signal frequency so that the two input frequencies are equal. Therefore, the output signal frequency is equal to the inverter power frequency scaled by a factor N/M such that, by the selection of the proper values for N and M, the output signal frequency will provide 360 pulses per machine cycle for any predetermined gob feed rate.

In an alternate embodiment, an oscillator generates a frequency reference signal which is frequency divided to generate a control signal to an inverter drive for generating electric power to the drive motor. The frequency reference signal is also frequency divided to generate the timing signal clock pulses typically at 360 pulses per machine cycle. In both embodiments, the clock pulse train is further frequency divided to generate reset pulses to define the end and beginning of successive machine cycles.

It is an object of the present invention to improve the performance of glassware forming machines.

It is another object of the present invention to reduce the circuitry required to control an individual section glassware forming machine by eliminating a separate clock source.

DESCRIPTION OF THE PREFERRED EMBODIMENT

Figure 1:
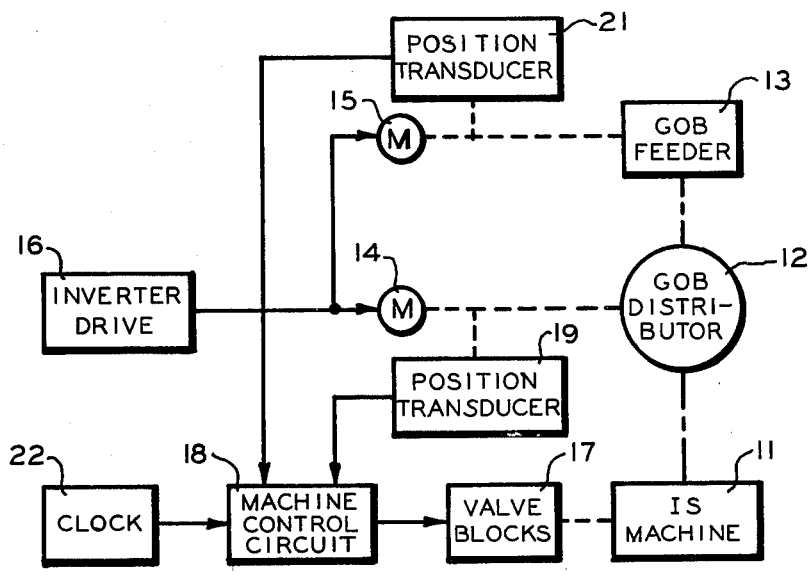
FIG. 1 is a block diagram of a prior art glassware forming apparatus.

There is shown in FIG. 1 a block diagram of a glassware forming apparatus according to the prior art. In this apparatus, the machine control circuit controls the actuation of the glassware forming means in accordance with information on the positions of the gob feeder and the gob distributor in their respective cycles of operation.

An individual section glassware forming machine 11 has a plurality of individual sections (not shown) which receive gobs of molten glass from a gob distributor 12 which in turn receives the gobs from a gob feeder 13. The gob distributor 12 and the gob feeder 13 are mechanically driven by a pair of drive motors, 14 and 15 respectively, which motors are connected to a supply of variable frequency power generated by an inverter drive 16. The inverter drive frequency is controlled to determine the rate at which the gobs are formed and distributed to the individual sections of the IS machine 11.

Each individual section is associated with a separate valve block which valve blocks are designated by the reference 17 in FIG. 1. Each valve block has valves connected to actuate a plurality of glassware forming means in the associated individual section. The valves in the valve blocks 17 are actuated by solenoids which are controlled by a machine control circuit 18 which determines the timing of the forming steps in accordance with a predetermined sequence of those steps. The control circuit receives information as to the sequence of the steps and the times between the steps from a source (not shown) such as control switches or a computer program. A pair of position transducers 19 and 21 are mechanically coupled to the drive motors 14 and 15 respectively and generate signals representing the relative positions of the gob distributor 12 and the gob feeder 13 respecctively. The gob feeder 13 represents a typical apparatus for expelling a quantity of molten glass from the forehearth of a glass furnace. Thus, the motor 15 can drive a crank (not shown) which is connected to reciprocate a plunger (not shown) to expel the quantity of glass. The quantity of glass is cut by shears (not shown) to form a gob which falls into the gob distributor 12. Since the forming of the gob is related to the rotational position of the drive motor 15, the position transducer 21 generates a signal indicating when each gob is formed. The gob distributor 12 is driven by the motor 14 to distribute the gobs to the individual sections of the IS machine in a predetermined sequence. Since the distribution of any one gob is related to the rotational position of the motor 14, the position transducer 19 generates a signal indicating when a gob is distributed and to which individual section. The control circuit 18 responds to the two position transducer signals to determine when the sequence of steps for each individual section is to be initiated in response to each gob formed and distributed.

The machine control circuit 18 also receives a clock signal from a source 22 which signal provides a reference for timing the machine cycle and the sequence of steps. Typically, machine timing is expressed in degrees and a machine cycle is 360° in length. The cycle for each individual section is also 360° but the cycles for the sections will be offset from the start of the machine cycle by different numbers of degrees to compensate for the difference in gob delivery time to each section. A glassware forming apparatus as shown in FIG. 1 is more fully described in the previously referenced U.S. Pat. No. 4,007,028.

Figure 2:
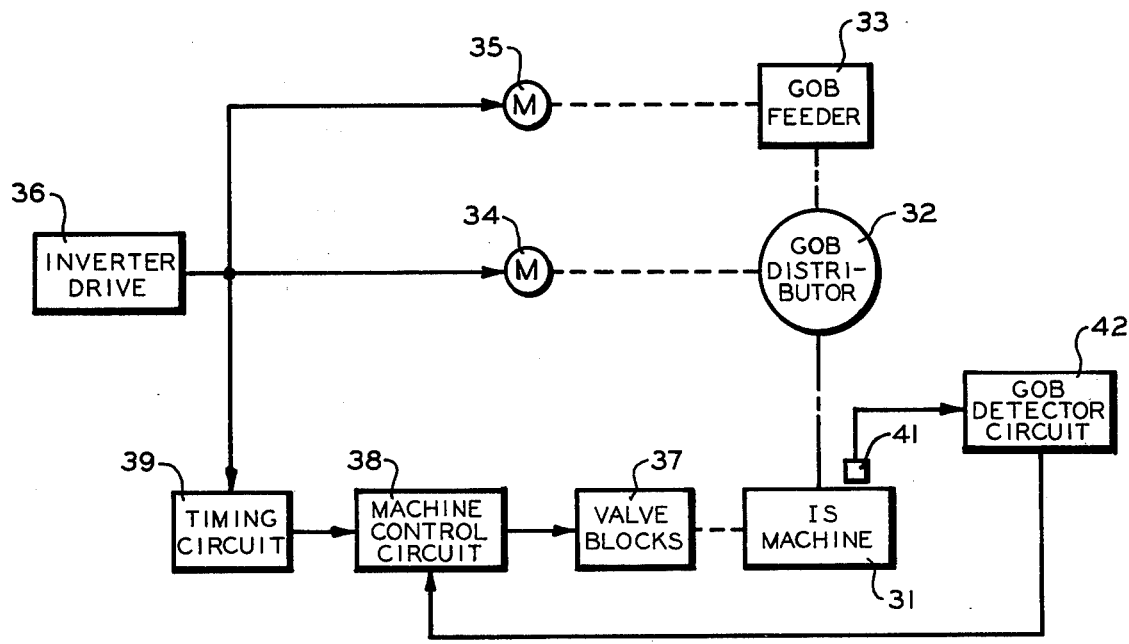
FIG. 2 is a block diagram of a glassware forming apparatus according to the present invention.

There is shown in FIG. 2 a block diagram of a glassware forming apparatus according to the present invention. In the prior art apparatus of FIG. 1, the gob distributor motor 14 was considered the zero phase motor and the gob feeder, pushout and conveyor motors are phased in manually at start-up. Thus, the timing of the individual sections relied upon the position of the gob distributor. In the present invention, the IS machine is considered the zero phase motor and the gob feeder, gob distributor, pushout and conveyor motors are phased in. Thus, the timing of the individual sections is fixed and the gob distributor is referenced thereto with a correction to the section timing, if needed, supplied by a detection of the gob at the mold to provide a more accurate control of the machine cycle.

As with the apparatus of FIG. 1, an individual section glassware forming machine 31 has a plurality of individual sections (not shown) which receive gobs of molten glass from a gob distributor 32 which in turn receives the gobs from a gob feeder 33. The gob distributor 32 and the gob feeder 33 are mechanically driven by a pair of drive motors, 34 and 35 respectively, which motors are connected to a supply of variable frequency power generated by an inverter drive 36. Each individual section is associated with a valve block which valve blocks are designated with the reference numeral 37. Each valve block is connected to a plurality of glassware forming means in the individual section for actuating the forming means in a predetermined timed sequence of steps to form glassware from the gobs supplied by the gob distributor 32. The valves in the valve blocks are actuated by solenoids which are controlled by a machine control circuit 38 which determines the timed sequence in accordance with a predetermined sequence of steps and timing clock signals generated by a timing circuit 39.

The control circuit 38 receives information as to the sequence of the steps and the times between the steps from a source (not shown) of such information. The timing circuit 39 is responsive to the frequency of the inverter drive output power to generate the clock signals. Since the speeds of the motors 34 and 35 are proportional to the frequency of the power generated by the inverter drive, the timing of the forming of the gob by the gob feeder 33 and the timing of the distribution of the gob by the gob distributor 32 are synchronized with the clock signal 39.

Although the distribution of the gob to each individual section is synchronized with the clock signals, the clock signals only provide information as to the rate of gob distribution and are utilized as a timing reference for the sequence of steps in the machine cycle in a manner similar to the clock signals generated by the clock source 22 of FIG. 1. Since there is no position transducer provided as in the apparatus of FIG. 1, the machine control circuit 38 has no information as to the time of gob distribution within the gob feeder cycle. Therefore, the timing circuit 39 also generates a timing reset signal to the control circuit 38 to initiate the machine cycle. The gob feeder 33 and the gob distributor 32 can then be phased in with reference to the reset signal such that the gob is distributed to the individual section at the required time in the machine cycle.

There is also shown in FIG. 2 a gob sensor 41 which generates a signal upon the detection of a gob at the mold in an individual section. A gob detector circuit 42 responds to the signal from the sensor 41 to generate a signal to the control circuit 38 which signal is utilized to adjust the timing of that individual section to the actual presence of the gob rather than to a position related distribution time as was done in the prior art. The gob sensor 41 and gob detector circuit 42 are the subject matter of U.S. patent application Ser. No. 856,473 in the name of Homer F. Peters and assigned to the assignee of the present application.

Figures 3, 5:
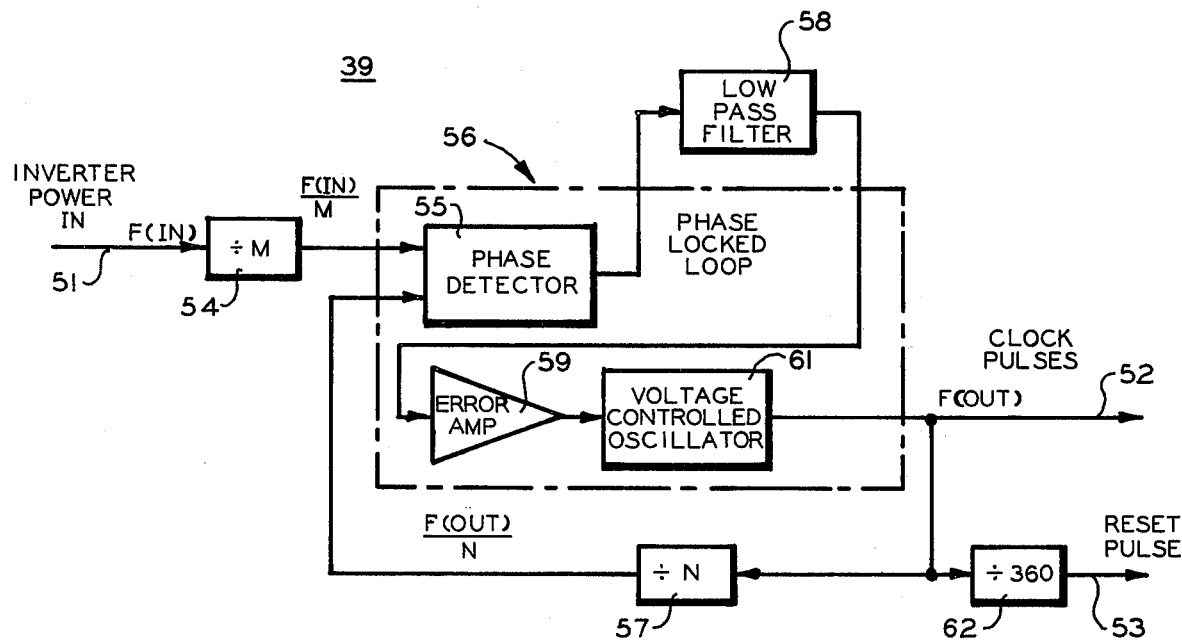
FIG. 3 is a block diagram of the timing circuit of FIG. 2.
FIG. 5 is a table of timing values for the glassware forming apparatus of FIG. 2.

There is shown in FIG. 3 a block diagram of the timing circuit 39 of FIG. 2. An input line 51 is connected to the output of the inverter drive 36 of FIG. 2 such that the timing circuit 39 responds to the frequency of the inverter output power to generate a clock pulse train on an output line 52 and reset pulses on a line 53. The inverter power having a frequency of F(IN) is an input to a frequency dividing circuit 54 having a frequency division factor of M which circuit generates a signal having a frequency of F(IN)/M. The output of the ÷ M circuit 54 is one input to a phase detector 55 in a phase locked loop 56. The line 52 is an output from the phase locked loop 56 on which is generated the clock pulse train at a frequency F(OUT). The line 52 is connected to an input of a second frequency dividing circuit 57 having a frequency division factor of N which circuit generates a signal having a frequency of F(OUT)/N.

The output of the ÷ N circuit 57 is the other input to the phase detector 55. The phase detector compares the frequencies of the two input signals, F(IN)/M and F(OUT)/N, and, if the frequencies are different, generates an error signal. The error signal is filtered by a low pass filter 58 external to the phase locked loop 56 and then amplified by an error amplifier 59 internal to the phase locked loop before being applied to the input of a voltage controlled oscillator 61 also internal to the phase locked loop. If the F(IN)/M frequency is greater than the F(OUT)/N frequency, the voltage controlled oscillator 61 responds to the error signal by increasing the F(OUT) frequency. If the F(IN)/M frequency is less than the F(OUT)/N frequency, the voltage controlled oscillator responds to the error signal by decreasing the F(OUT) frequency. Therefore, the phase locked loop drives the error signal to zero such that $F(IN)/M = F(OUT)/N$ and the loop circuit remains locked with $F(OUT) = N \cdot F(IN)/M$.

The clock pulse output line 52 is also connected to an input of a third frequency dividing circuit 62 having a frequency division factor of 360 which circuit generates reset pulses on the line 53. Typically, the timing of the IS machine is based on a full cycle of 360° which is represented by 360 clock pulses. Therefore, the reset pulses on the line 53 define the end and beginning of successive machine cycles.

The elements shown in FIG. 3 are commercially available as integrated circuits or can be constructed from discrete components in accordance with well-known circuits. For example, the dividing circuits 54 and 57 can be a CD 4018A presettable divide-by-N counter, the dividing circuit 62 can be a CD 4059A programmable divide-by-N counter and the circuit 56 can be a CD 4046 A phase locked loop all manufactured by RCA, Box 3200, Somerville, N.J. 08876.

Figure 4:
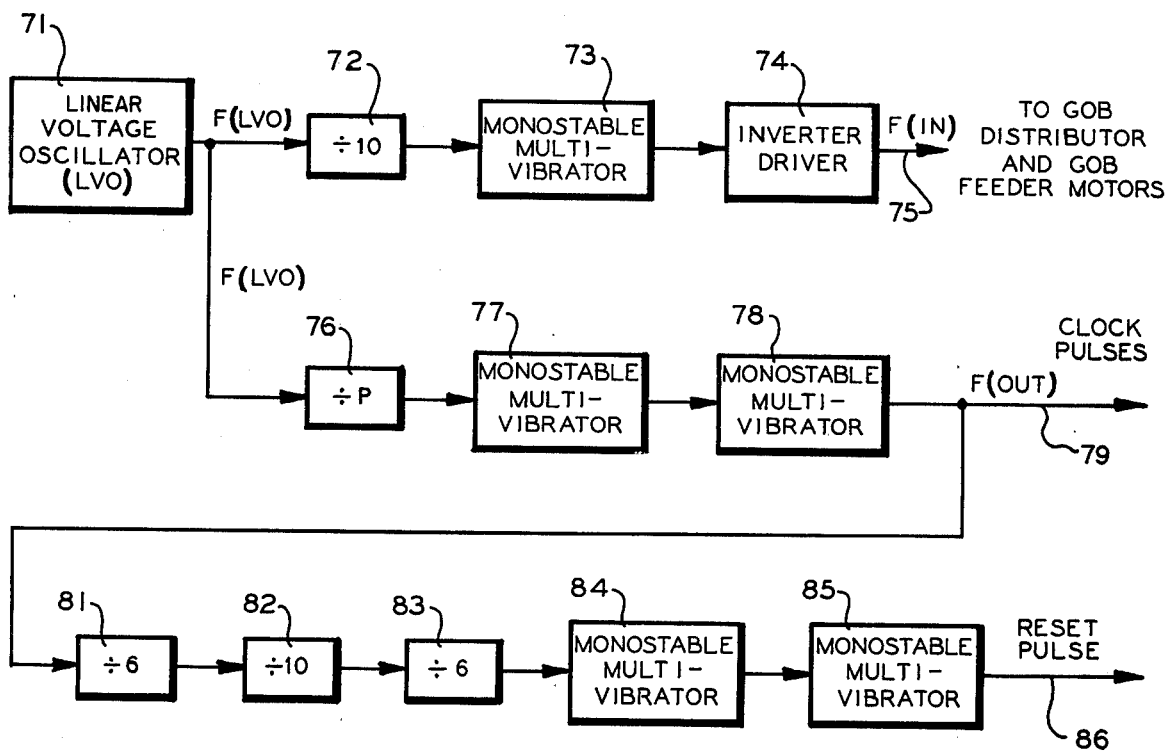
FIG. 4 is a block diagram of an alternate embodiment of the timing circuit according to the present invention.

There is shown in FIG. 4 a block diagram of an alternate embodiment of a circuit which can be used to generate the clock signals and the reset signal to the machine control circuit. A linear voltage controlled oscillator (LVO) 71 is utilized to generate a reference signal F(LVO) at a frequency 60 times the frequency at which the gob distributor and the gob feeder motors are to be driven. This signal is an input to a frequency dividing circuit 72 having a frequency division factor of 10. The ÷ 10 circuit 72 generates an output pulse train having pulses with a width approximately equal to two cycles of the input signal. The output of the ÷ 10 circuit 72 is connected to a monostable multivibrator 73 which generates an output pulse train having pulses with a width approximately equal to the width of the pulses generated by the LVO 71. The multivibrator 73 functions to reduce the width of the pulses generated by the ÷ 10 circuit 72 such that circuitry internal to an inverter driver 74 will not be overloaded. The output signal of the multivibrator 73 is applied to the inverter driver 74 to generate electric power on a line 75 at a frequency of F(IN) which power is used to drive the gob distributor and the gob feeder motors. Typically, the inverter driver 74 functions as a three-phase, full-wave rectifier such that the frequency F(IN) is equal to the frequency of the inverter driver input signal divided by six. Thus, the gob distributor and the gob feeder motors receive a signal at a frequency $F(IN) = F(LVO)/60$. It should be noted that a buffer circuit (not shown) may be connected between the multivibrator 73 and the inverter driver 74 for interfacing logic voltage levels with the inverter driver control signal voltage levels.

The output of the LVO 71 is also connected to a second frequency dividing circuit 76 having a frequency division factor of P. The output of the ÷ P circuit 76 is connected to a monostable multivibrator 77 which functions to "clean up" the output pulse train of the ÷ P circuit 76. Another monostable multivibrator 78 is provided to regulate the width of the clock pulses which are generated on a line 79 at a frequency $F(OUT) = F(LVO)/P$. These clock pulses are supplied to the machine control circuit which utilizes the pulses as a reference for timing the machine cycle. An inverter (not shown) may be required between the multivibrators 77 and 78 to keep the LVO 71 output pulses and the clock pulses on the line 79 in phase since the multivibrator 78 typically triggers on the trailing edge of a "1"

pulse. A buffer circuit (now shown) can be connected to the line 79 to function as a signal level interface.

The clock pulse line 79 is also connected to an input of a third frequency dividing circuit 81 having a frequency division factor of six. The ÷ 6 circuit 81 is connected to a fourth frequency dividing circuit 82 having a dividing factor of ten. The ÷ 10 circuit 82 is connected to a fifth frequency dividing circuit 83 having a dividing factor of six. Together, the circuits 81, 82 and 83 function to generate a signal to a monostable multivibrator 84 at a frequency of F(OUT)/360. The multivibrator 84 functions to "clean up" the output pulse train of the ÷ 6 circuit 83. Another monostable multivibrator 85 is provided to regulate the pulse width of the reset pulses which are generated on a line 86 at a frequency of F(OUT)/360. As previously discussed, the timing of the IS machine is typically based on a full cycle of 360° which is represented by 360 clock pulses. Therefore, the reset pulses on the line 86 define the end and beginning of successive machine cycles. An inverter (not shown) may be required between the multivibrators 84 and 85 to keep the clock pulses on the line 79 and the reset pulses on the line 86 in phase since the multivibrator 85 typically triggers on the trailing edge of a "1" pulse. A buffer circuit (not shown) can be connected to the line 86 as a signal level interface.

The elements shown in FIG. 4 are commercially available as integrated circuits or can be contructed from discrete components in accordance with well-known circuits. For example, a MC14566 industrial time base generator is capable of simultaneously providing a divide-by-10 counter, a divide-by-6 counter and an internal monostable multivibrator. Thus, one MC14566 can be used for the dividing circuits 72 and 81 and multivibrator 77 while another MC14566 can be used for the dividing circuits 82 and 83 and the multivibrator 84. The dividing circuit 76 can be a MC14569 programmable divide-by-N counter. The multivibrator 73 can be a MC14538 precision monostable multivibrator while the multivibrators 78 and 85 can be NE 555 timers which have been connected to function as monostable multivibrators. The "MC" circuit elements are manufactured by Motorola, Ins., Box 20912, Phoenix, Ariz. 85036 and the NE 555 tuner is manufactured by Signetics.

There is shown in FIG. 5 a table of timing values for various inverter drive frequencies and numbers of individual sections. Typically, the inverter drive output power frequency is variable from twenty to one hundred hertz. The drive motor 35 is connected to the gob feeder 33 through gearing to operate at a speed corresponding to 48 inverter frequency cycles for each gob formed and cut by the shears in an IS machine having six sections. Thus, the number of cuts/minutes is determined by multiplying the inverter frequency in hertz by 60 seconds/minute, and dividing by 48 cycles/cut. There are shown in the table of FIG. 4 values of inverter frequency. The IS machine cycle rate or turns/minute is determined by dividing the cuts/minute value by the number of individual sections, in this example six. The gearing for the gob feeder is changed to accommodate different numbers of sections so as to maintain the same turns/minute value for a selected inverter frequency. As shown in the table, an eight section machine is geared for 36 cycles/cut and a ten section machine is geared for twenty-eight point eight cycles/cut.

The frequency of the output signal from the timing circuit 39 of FIG. 3 must correspond to 360 pulses per machine cycle or turn. At an inverter frequency of 24 hertz, the turns/minute value is five thereby requiring a total of five times 360 pulses per minute which is a frequency of 30 hertz. The value of N/M is one point two five. Therefore, N can be five and M can be four in the block diagram of FIG. 3.

The frequency of the clock pulses generated by the circuit of FIG. 4 must correspond to 360 pulses per machine cycle. If the inverter driver is generating three-phase power, the input pulse train frequency is six times the output power frequency since six control pulses are required, one for each half cycle. When the LVO 71 frequency is at 1440 Hz the inverter driver is operating at 24 Hz and the turns/minute is five thereby requiring a total of five times 360 pulses per minute which is a frequency of 30 Hz. Thus, if F(OUT) is to equal 30 Hz, the value of P must be 48 since F(OUT) = F(LVO)/P = 1440/48 = 30 Hz.

Figure 6:
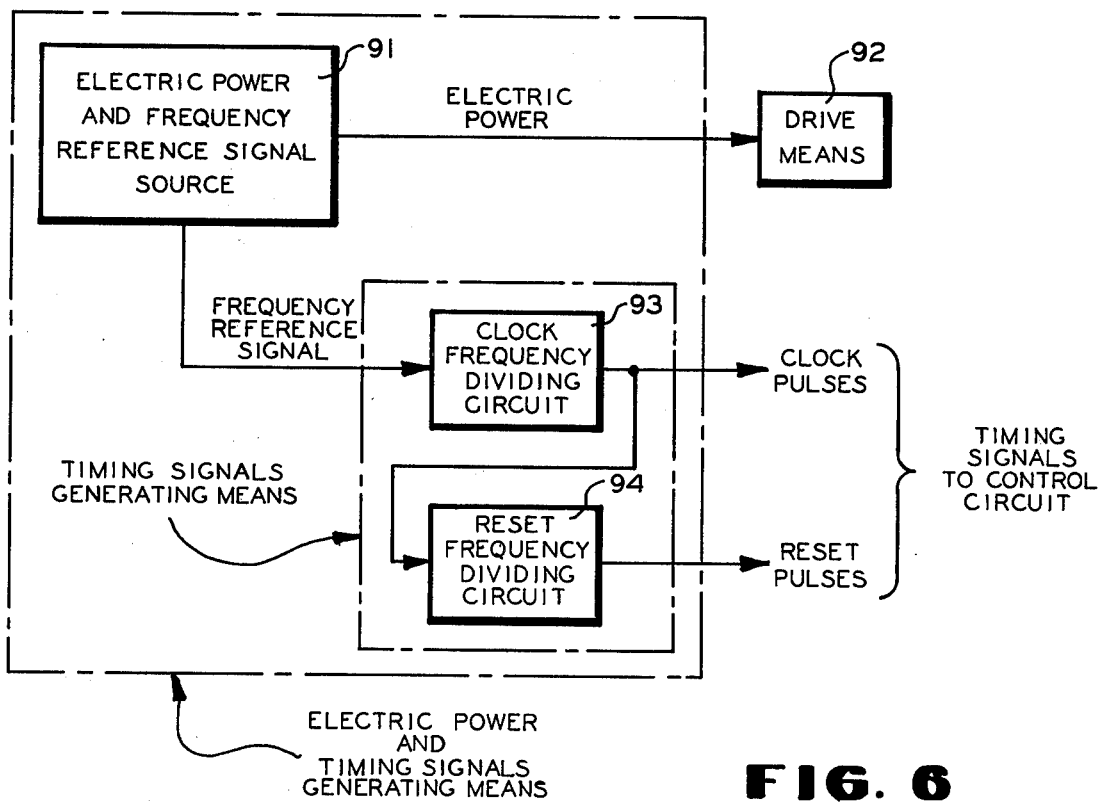
FIG. 6 is a generalized block diagram of the timing circuits according to the present invention.

In summary, the present invention concerns an electric power and timing signals generating means for an apparatus for forming glassware. There is shown in FIG. 6 a block diagram of the electric power and timing signals generating means which diagram will be utilized to summarize the present invention. The glassware forming apparatus includes means for forming gobs of molten glass and for distributing the gobs to an individual section glassware forming machine at a predetermined rate, means for generating electric power at a selected frequency and timing signals at a frequency proportional to the selected frequency, drive means responsive to the electric power for driving the means for forming and distributing gobs at the predetermined rate and a control circuit responsive to said timing signals for cyclically controlling each individual section machine in a predetermined time sequence of steps for forming glassware from the gobs.

The electric power and timing signals generating means includes an electric power and frequency reference signal source 91 and a means responsive to the frequency reference signal for generating the timing signals. The source 91 generates electric power to a drive means 92 for the gob forming and distributing means and the frequency reference signal to a timing signals generating means. In one embodiment, see FIG. 4, the electric power and frequency reference signal source includes an oscillator for generating the frequency reference signal, a frequency dividing means responsive to the frequency reference signal for generating a control signal having a frequency equal to the reference signal frequency divided by a factor and an inverter drive means responsive to the control signal for generating the electric power at the selected frequency. In another embodiment, see FIG. 3, the electric power and frequency reference signal source includes an inverter drive means for generating the electric power at the selected frequency. In this embodiment, the electric power signal also functions as the frequency reference signal which is supplied to the timing signals generating means.

The timing signals generating means includes a clock frequency dividing circuit 93 for generating clock pulses which are utilized by the glassware forming machine control circuit as a reference for timing the machine cycle which is typically defined by 360 clock pulses, although more or less pulses could be utilized. The timing means also includes a reset frequency dividing circuit 94 for generating reset pulses which typically have a frequency of one pulse per machine cycle.

In one embodiment, see FIG. 4, the timing signals generating means includes a first frequency dividing means responsive to the frequency reference signal for generating a timing clock signal having a frequency equal to the reference signal frequency divided by a first factor P. A second frequency dividing means is responsive to the timing clock signal for generating a timing reset signal having a frequency equal to the clock signal frequency divided by a second factor 360.

In another embodiment, see FIG. 3, the timing signals generating means includes a first frequency dividing means responsive to the electric power for generating a first input signal having a frequency equal to the electric power frequency divided by a first factor M, second frequency dividing means responsive to the timing signals for generating a second input signal having a frequency equal to the timing signals frequency divided by a second factor N and a phase locked loop responsive to the first and second input signals for generating the timing signals having a frequency equal to the electric power frequency divided by the first factor and multiplied by the second factor. A third frequency dividing means is responsive to the timing signals for generating timing reset signals having a frequency equal to the timing signals frequency divided by a third factor 360.

The circuits shown in FIGS. 3 and 4 can also be combined to form a timing pulse generator where it is desired to operate the drive motor from a selected one of two or more different power sources. For example, power for normal operation could be generated by an inverter and power for emergency operation could be generated by a varidyne. In FIG. 3, the line 51 would be connected to the power input terminal for the drive motor. The ÷ M circuit 54 could be set to a value of one or could be replaced by a filter such that the signal having the frequency of F(IN)/M is of the same frequency as the frequency of the input power to the drive motor. The ÷ N circuit 57 is set to divide by a factor of 60 such that the output signal on the line 52 has a frequency of F(OUT) = N · F(IN)/M = 60 · F(IN). The frequency dividing circuit 62 is not utilized.

In FIG. 4, the LVO 71, the ÷ circuit 72, the monostable multivibrator 73 and the inverter driver 74 are not utilized. The line 52 from the modified circuit of FIG. 3 is connected to the input of the ÷ P circuit 76. If the factor P is set at 48, the relationship between the frequency of the motor power, F(IN) of FIG. 3, and the frequency of the clock pulses, F(OUT) of FIG. 4, will be F(OUT) = 60 · F(IN)/48 = 1.25 F(IN) to maintain the correct relationship between the speed of the drive motor and the timing of the IS machine.

In accordance with the provisions of the patent statutes, the principle and mode of operation of the invention have been explained in its preferred embodiment. However, it must be understood that the invention may be practiced otherwise than as specifically illustrated and described without departing from its spirit or scope. Although the power source has been described as an inverter drive, any source of AC single or poly-phase power can be utilized such as a motor/generator drive. If it is not desirable to consider the individual section machine as the zero phase reference, means can be provided for changing the ratio of 1.25 between the power source frequence and the clock pulse frequency momentarily to advance or retard the phase of the machine with respect to the gob feeder or gob distributor. For example, in FIG. 4 the counter 76 can be selectively programmed to vary from the normal divide by forty-eight upon the actuation of one or more switches to advance or retard the clock pulses and reset pulses with respect to the phase of the electric power from the inverter driver.

What is claimed is:

1. An apparatus for forming glassware comprising:
   means for forming gobs of molten glass and for distributing said gobs to an individual section glassware forming machine at a predetermined rate;
   electric means for generating electric power at a selected frequency;
   frequency proportioning means connected to said electric power generating means for generating timing signals at a frequency proportional to said selected frequency;
   electric drive means responsive to the electric power for driving said means for forming and distributing gobs at said predetermined rate; and
   a control circuit responsive to said timing signals for cyclically controlling each individual section of said individual section machine in a predetermined time sequence of steps for forming glass from said gobs.

2. An apparatus according to claim 1 wherein a machine cycle is equal in duration to the time required for an individual section to form one article of glassware and said timing signals include a timing clock signal having a frequency of 360 pulses per machine cycle.

3. An apparatus according to claim 2 wherein said timing signals include a timing reset signal having a frequency of one pulse per machine cycle.

4. An apparatus according to claim 1 wherein said electric power and timing signals generating means includes an inverter drive means for generating said electric power at said selected frequency.

5. An apparatus according to claim 1 wherein said electric power and timing signals generating means includes means responsive to said electric power for generating said timing signals.

6. An apparatus according to claim 5 wherein said timing signals generating means includes a first frequency dividing means responsive to said electric power for generating a first input signal having a frequency equal to said electric power frequency divided by a first factor, a second frequency dividing means responsive to said timing signals for generating a second input signal having a frequency equal to said timing signals frequency divided by a second factor, and a phase locked loop responsive to said first and second input signals for generating said timing signals having a frequency equal to said electric power frequency divided by said first factor and multiplied by said second factor.

7. An apparatus according to claim 6 wherein said timing means includes a third frequency dividing means responsive to said timing signals for generating timing reset signals having a frequency equal to said timing signals frequency divided by a third factor, said timing reset signals defining the time required for an individual section to form one article of glassware.

8. In an apparatus for forming glassware including gob feeding means for forming gobs of molten glass at a predetermined rate, means for distributing the gobs to an individual section glassware forming machine at the predetermined rate, the individual sections each having means for forming glassware from the gobs in a predetermined timed sequence of forming steps, an inverter for generating electric power at a predetermined frequency, electrical drive means responsive to the inverter power for driving the gob feeding means and the gob distributing means at the predetermined rate, a control circuit responsive to timing signals for controlling the predetermined timed sequence of steps in each of the individual sections and timing means for generating the timing signals, the timing means comprising:

means responsive to the inverter power for generating a first input signal having a frequency equal to the inverter power frequency divided by a first factor;

means responsive to the timing signals for generating a second input signal having a frequency equal to the timing signal frequency divided by a second factor; and means responsive to said first and second input signals for generating the timing signals at a frequency equal to the inverter power frequency divided by said first factor and multiplied by said second factor.

9. A timing means according to claim 8 wherein said first factor is the integer four and said second factor is the integer five.

10. A timing means according to claim 8 including means responsive to the timing signals for generating reset signals having a frequency equal to the timing signals frequency divided by a third factor wherein the control circuit is responsive to said reset signals for defining cycles of the individual section machine.

11. A timing means according to claim 8 wherein said first and second input signal responsive means is a phase locked loop.

* * * * *